(12) United States Patent
Celerier (10) Patent No.: US 9,387,942 B2
(45) Date of Patent: Jul. 12, 2016

(54) PROPULSION SYSTEM WITH FOUR MODULES FOR SATELLITE ORBIT CONTROL AND ATTITUDE CONTROL

(71) Applicant: THALES, Neuilly-sur-Seine (FR)

(72) Inventor: Bruno Celerier, Toulouse (FR)

(73) Assignee: Thales (FR)

( * ) Notice: Subject to any disclaimer, the term of this patent is extended or adjusted under 35 U.S.C. 154(b) by 284 days.

(21) Appl. No.: 14/298,689

(22) Filed: Jun. 6, 2014

(65) Prior Publication Data

US 2014/0361124 A1  Dec. 11, 2014

(30) Foreign Application Priority Data

Jun. 7, 2013  (FR) ...................................... 13 01303

(51) Int. Cl.
| | |
|---|---|
| *B64G 1/26* | (2006.01) |
| *B64G 1/40* | (2006.01) |
| *B64G 1/24* | (2006.01) |
| *B64G 1/10* | (2006.01) |

(52) U.S. Cl.
CPC ........ *B64G 1/242* (2013.01); *B64G 1/26* (2013.01); *B64G 1/40* (2013.01); *B64G 1/401* (2013.01); *B64G 1/1007* (2013.01); *B64G 1/1014* (2013.01); *B64G 1/1021* (2013.01)

(58) Field of Classification Search
CPC .......... B64G 1/405; B64G 1/401; B64G 1/40; B64G 1/26
See application file for complete search history.

(56) References Cited

U.S. PATENT DOCUMENTS

| | | | |
|---|---|---|---|
| 3,314,609 A | | 4/1967 | Horgan et al. |
| 4,955,559 A | | 9/1990 | Kaminskas |
| 5,349,532 A | * | 9/1994 | Tilley et al. ...................... 701/13 |
| 5,957,411 A | * | 9/1999 | Liu et al. ........................ 244/169 |
| 6,032,904 A | * | 3/2000 | Hosick et al. .................. 244/169 |
| 6,053,455 A | * | 4/2000 | Price et al. ..................... 244/169 |
| 6,439,507 B1 | * | 8/2002 | Reckdahl et al. ........... 244/158.8 |
| 6,565,043 B1 | | 5/2003 | Wittmann |
| 6,637,701 B1 | * | 10/2003 | Glogowski et al. ............ 244/169 |
| 2014/0109552 A1 | | 4/2014 | Caubet et al. |

FOREIGN PATENT DOCUMENTS

| | | |
|---|---|---|
| EP | 0568209 A1 | 4/1992 |
| EP | 0937644 A2 | 8/1999 |
| FR | 2626318 A1 | 7/1989 |
| WO | 2009076448 A1 | 6/2009 |
| WO | 2012/156642 A1 | 11/2012 |

\* cited by examiner

*Primary Examiner* — Tien Dinh
*Assistant Examiner* — Richard R Green
(74) *Attorney, Agent, or Firm* — Baker Hostetler LLP (57) ABSTRACT

A propulsion system for the orbital control of a satellite with terrestrial orbit travelling with a speed of displacement along an axis V tangential to the orbit comprises two propulsion assemblies, fixed to the satellite facing one another with respect to the plane of the orbit, each of the propulsion assemblies comprising two propulsion modules; each of the propulsion modules successively comprising: a motorized link for rotation about an axis parallel to the axis V, an offset arm, and a platen supporting a propulsion unit able to deliver a thrust oriented along an axis perpendicular to the axis V; the two propulsion modules of each propulsion assembly being linked to the satellite on either side and substantially at equal distances from a plane perpendicular to the axis V passing through a centre of mass of the satellite.

18 Claims, 5 Drawing Sheets

PRIOR ART

FIG.1

PRIOR ART

PRIOR ART

PROPULSION SYSTEM WITH FOUR MODULES FOR SATELLITE ORBIT CONTROL AND ATTITUDE CONTROL

CROSS-REFERENCE TO RELATED APPLICATION

This application claims priority to foreign French patent application No. FR 1301303, filed on Jun. 7, 2013, the disclosure of which is incorporated by reference in its entirety.

FIELD OF THE INVENTION

The present invention relates to the field of orbital control systems and satellite attitude control, and more particularly the architecture of onboard propulsion systems for the orbital control of geostationary telecommunications satellites.

BACKGROUND

To allow the use of the diverse mission instruments of a satellite, such as telecommunications systems, it is required to be able to control the position and the orientation of the satellite in orbit. Accordingly, control systems are implemented to maintain on the one hand the orientation of the satellite with respect to the earth, this being attitude control, and on the other hand its position in orbit with respect to a desired ideal position, this being orbital control. For example in the case of geostationary satellites, orbital control seeks to limit the inclination with respect to the equatorial plane, to limit the eccentricity of the orbit, and to limit the drift of the longitudinal position of the satellite with respect to the earth. Accordingly, propulsion units are positioned at diverse locations on the satellite so as to correct the trajectory at more or less close intervals by applying a force to the satellite. These station-keeping operations make it necessary to be able to have a sufficient reserve of fuel throughout the life of the satellite.

A satellite is placed in orbit through the combination of a launcher space vehicle and of its own propulsion systems. The launcher transports and releases the satellite on a first so-called terrestrial transfer orbit, whose perigee is generally low; once on this first orbit, a propulsion system of the satellite takes over to transport the satellite to its final orbit. Generally, this transfer is carried out by means of a principal satellite propulsion unit PSP consuming a chemical fuel of propellant type, delivering a high-power thrust making it possible to rapidly reach the final orbit.

Once placed on station, several lower-power secondary propulsion units maintain the satellite in position in the orbit. Accordingly, propellant-based chemical propulsion units or electric propulsion units may be used. In an electric propulsion unit, of plasma propulsion unit or ion propulsion unit type, xenon atoms are ionized by collision with electrons, creating xenon ions. The thrust is generated when the charged xenon ions are accelerated out of the propulsion unit by an electromagnetic field. Although expensive and of significant initial mass, the effectiveness of the propulsion unit, or its capacity to generate force by ejecting mass, also called specific impulse, is substantially more significant than that of chemical propulsion units.

In the known systems, chemical propulsion units and electric propulsion units are positioned at several locations on the structure of the satellite so as to address all of the mission requirements, from transport from the transfer orbit to the maintaining of the satellite in orbit throughout its life. The drawback of the propulsion systems thus implemented is the high cost and high mass of the various propulsion units and the fuel. These drawbacks limit the satellite's payload stowage capacity.

Figure 1:
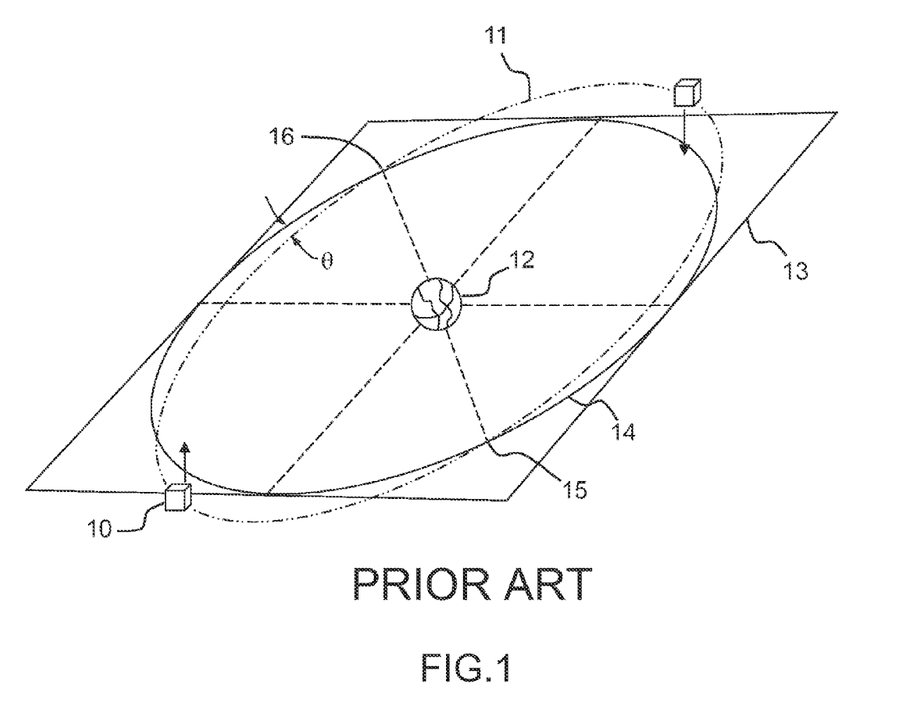

According to the known state of the art, an orbital control system seeks to steer the position of the satellite via six orbital parameters. FIG. 1 represents a geostationary satellite 10 in orbit 11 around the earth 12. The orbit 11 is inclined by an angle θ with respect to the equatorial plane 13 which contains the ideal geostationary orbit 14. The satellite's orbit 11 cuts the equatorial plane 13 at two points 15 and 16, customarily called orbital nodes. The six orbital parameters used to describe the position of a satellite are also known: the semimajor axis, the eccentricity, the inclination, the argument of the ascending node, the argument of the perigee, and the true anomaly. Orbital control consists in quantifying these orbital parameters and in carrying out the operations necessary by means of the onboard propulsion systems, to maintain the satellite in a predefined zone around an ideal position. By way of example, for a geostationary satellite, a drift window of plus or minus 0.1°, representing a width of almost 150 km, is allotted around a target position.

Figure 2:
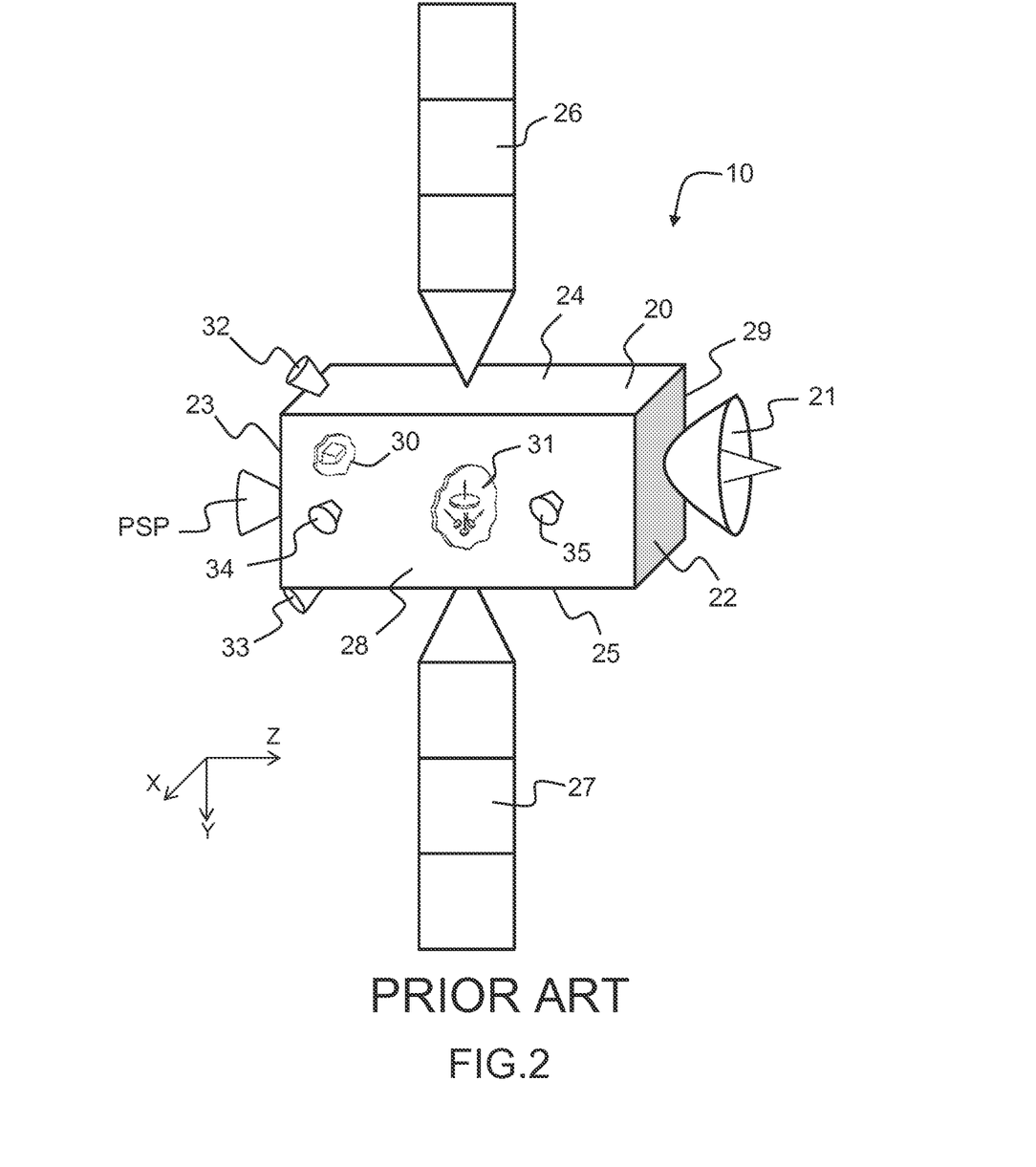

A contemporary architecture, such as represented in FIG. 2, of a satellite 10 comprises a parallelepipedal structure 20 on which are fixed diverse devices useful for the steering of the satellite 10 and for its mission. Telecommunications instruments 21 are installed on a face 22 whose orientation is maintained towards the earth, commonly called the earth face. On an opposite face 23, commonly called the anti-earth face, is positioned the principal satellite propulsion unit PSP which ensures notably the thrust necessary for transfer from the low orbit to the final orbit. On two opposite lateral faces 24 and 25, commonly called the North face and the South face, because of their orientation with respect to the equatorial plane, are positioned two sets of solar panels 26 and 27 allowing the supply of electrical power to the onboard systems. Diverse devices may be carried onboard the lateral faces 28 and 29, commonly called East and West face for their orientation with respect to a terrestrial longitude. The maintaining of a constant orientation of the satellite with respect to the earth is necessary for the proper progress of the satellite mission, for example in respect of the orientation of the solar panels 26 and 27 or the pointing of the telecommunications systems 21 towards earth. This is carried out by means of an attitude control system. Several attitude control systems able to detect and correct orientation errors are known. Thus, the measurement of the satellite orientation can be carried out by means of a sensor assembly, comprising for example an earthward directed sensor, positioned on the earth face for a measurement in regard to two axes, pitch and roll, with respect to the earth and an assembly 30 of gyroscopes for detection of the rotation speeds in regard to three axes. On the basis of these measurements, corrections of orientation of the satellite around its centre of gravity can be made, for example by means of an assembly of inertia wheels 31 or of gyroscopic actuators.

A satellite equipped with such a system allowing attitude control is said to be stabilized in regard to three axes. Typically, by controlling the rotation speed and the orientation of the inertia wheels, one knows how to correct an orientation error in a reference trihedron tied to the satellite. Hereinafter, we call Z an axis directed towards the earth, also called the yaw axis, Y an axis perpendicular to the orbit and oriented in the sense opposite to the angular momentum of the orbit (Southwards for a geostationary), also called the pitch axis, and X an axis forming with Y and Z a right-handed orthogonal frame, also called the roll axis which is oriented along the speed in the case of circular orbits.

For orbital control, several propulsion units are disposed on the structure 20 of the satellite 10. A first propulsion unit of large power PSP, making it possible to ensure the transfer between the initial terrestrial orbit (after launcher release) and the final orbit, is positioned on the anti-earth face 23. According to a known state of the art, a first assembly of propulsion units, comprising for example two propulsion units 32 and 33 positioned in the North face and in the South face in proximity to the anti-earth face, is used to control the inclination. A second assembly of propulsion units, such as for example the propulsion units 34 and 35, positioned in the East and West faces, is used for the control of the eccentricity and the drift. It is also known that the control of the inclination requires of the order of five to ten times as much fuel as the control of the eccentricity and drift. For this reason, inclination control is in general carried out by means of plasma propulsion unit, a more frugal consumer of fuel, while the propulsion units dedicated to the control of the eccentricity and drift are usually chemical propellant based.

By way of example, a contemporary satellite of dry mass 2500 kg and making it possible to carry an onboard payload of 900 kg, comprises a principal propulsion unit, two plasma propulsion units for the inclination and the eccentricity, and four propellant-based propulsion units for the eccentricity and the drift. Typically, 1700 kg of propellant are necessary for the initial transfer of orbit, and 220 kg of Xenon are necessary to ensure the orbital control of the satellite for a mission duration of about 15 years. Thus, the cost and the mass of current propulsion systems limit the capacity to carry a heavy payload onboard. Let us also note that in most known propulsion systems for orbital control, the various onboard propulsion units comprise in reality two propulsive motors positioned side by side, for mission safety and reliability reasons. This redundancy, well known to the person skilled in the art, is not represented in the figures but it is considered hereinafter that a propulsion unit may consist of one or more propulsive motors forming a propulsive assembly, and whose deliverable thrust is identical, in orientation or in intensity.

Figure 3A:
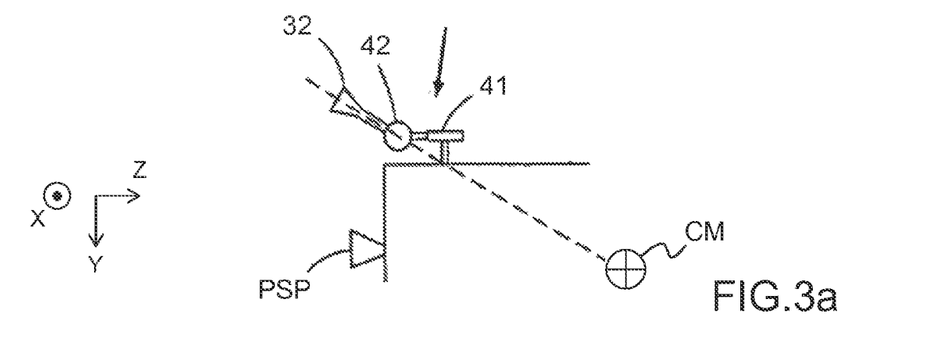
Figure 3B:
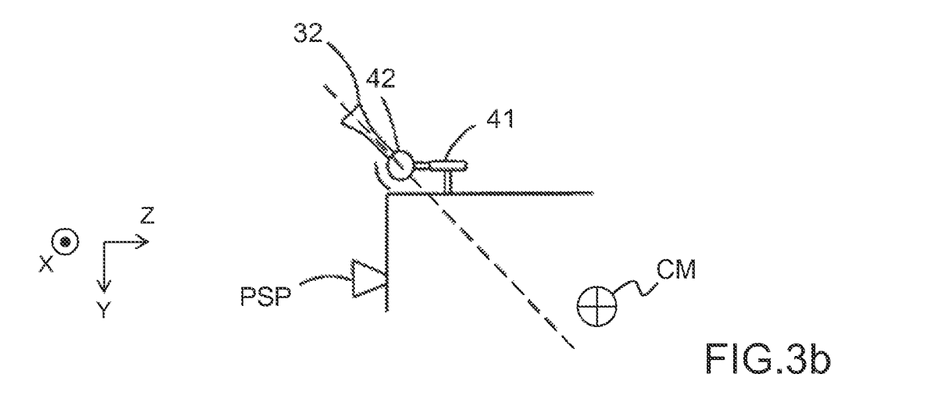
Figure 3C:
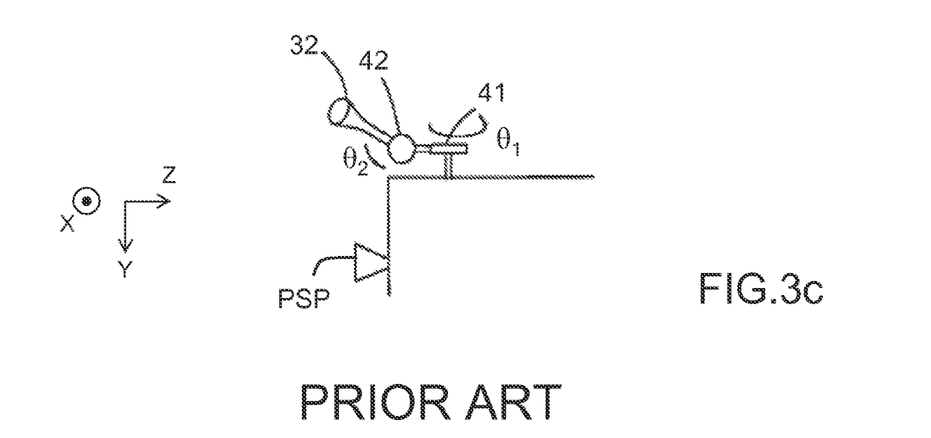

FIGS. 3a, 3b and 3c illustrate the principle of the orbital control for a satellite according to the known state of the art. The structure 20 of the satellite 10 is represented in side view, the East face being visible. The propulsion unit 32 is linked to the North face of the structure 20 by means of a two-axis mechanism 40. The two-axis mechanism 40 allows the rotation of the propulsion unit 32 with respect to the structure 20 according to a first axis parallel to the Y axis and a second axis parallel to the X axis. In FIGS. 3a to 3c, the two-axis mechanism 40 is a gimbal link achieved by means of a first pivot link 41 of axis parallel to the Y axis and a second pivot link 42 of axis parallel to the X axis. The centre of mass of the satellite, situated inside the parallelepipedal structure 20, is referenced CM.

In FIG. 3a, the orientation of the propulsion unit 32 makes it possible to direct the thrust of the propulsion unit towards the centre of mass CM of the satellite. To perform an inclination correction manoeuvre, a technique known to the person skilled in the art consists in firing the propulsion unit 32 a first time in proximity to an orbital node, for example 15, and then the propulsion unit on the opposite side a second time in proximity to the opposite orbital node, 16 in the example. Thus, the thrust, oriented towards the centre of mass CM, of the first firing of the propulsion unit 32 displaces the satellite in a direction having a Z component and a Y component. Twelve hours afterwards, the thrust of the second firing at the opposite orbital node, displaces the satellite in a direction having a Z component opposite to the first firing, and which compensates the undesired effect thereof on the eccentricity and a likewise opposite Y component but whose desired effects in terms of inclination are compounded. Thus, two firings of equal intensities carried out at twelve hour intervals in proximity to the orbital nodes 15 and 16 make it possible to cancel the effect of the radial component and preserve only a North-South correction. This known procedure allows daily correction of the inclination.

With this same technique it is also possible, by applying a second thrust of different intensity to the first, to apply eccentricity corrections along an axis perpendicular to the line joining the two orbital nodes 15 and 16. Techniques have also been developed to allow eccentricity corrections according to a second axis, by shifting the firing of the propulsion unit with respect to the orbital node, but at the price of less good effectiveness of the control of the inclination. To summarize, the known systems make it possible by means of two propulsion unit systems 32 and 33 to ensure the control of the inclination and the control of the eccentricity along an axis without deoptimization of the inclination control, or to ensure the control of the inclination and the control of the eccentricity according to two axes with deoptimization of the inclination control. The control of the drift may not be carried out by these two propulsion units. A contemporary satellite accordingly comprises four chemical-propellant nozzles positioned on the East and West faces of the satellite.

The propulsion unit systems 32 and 33 are also useful for managing the momentum of attitude control systems, as illustrated in FIGS. 3b and 3c. By applying a thrust off the centre of mass CM—in a plane Y-Z in FIG. 3b and off the plane Y-Z in FIG. 3c, a rotation torque is generated on the satellite—a roll torque in FIG. 3b and a pitch and yaw torque in FIG. 3c. These two torques can be used to charge or discharge the inertia wheels in relation to two axes. For example, when the rotation speed of an inertia wheel reaches its limit speed, it will be sought to intentionally orient the thrust off the centre of mass CM so as to generate, in addition to the desired displacement of the satellite, a torque making it possible to desaturate the inertia wheel, or more generally, the problem will be anticipated by bringing the angular momentum down to desired values upon each manoeuvre. These desired values being able of course to be zero, but also a judiciously defined value such as to anticipate the evolution of the angular momentum between two manoeuvres under the effect of the radiation pressure, notably solar.

Let us also note that the centre of mass of the satellite varies in the course of the life of the satellite, notably because of the progressive consumption of the onboard fuel. In the known systems, algorithms are implemented for the combined management of attitude control and of orbital control, and to make it possible to take account of the position of the centre of mass CM throughout the life of the satellite.

The issue of being able to have effective propulsion systems is therefore understood. The current solutions, which implement different nature propulsion units at diverse locations of the satellite, are relatively complex and expensive, and exhibit a high mass which limits the satellite's stowage capacity.

SUMMARY OF THE INVENTION

The invention is aimed at proposing an alternative solution for controlling the orbit and achieving the torques to be exerted on the satellite during the manoeuvres while alleviating the difficulties of implementation cited hereinabove.

For this purpose, the subject of the invention is a propulsion system for the orbital control of a satellite with terrestrial orbit travelling with a speed of displacement along an axis V tangential to the orbit, characterized in that it comprises two propulsion assemblies, fixed to the satellite, and facing one another with respect to the plane of the orbit; each of the propulsion assemblies comprising two propulsion modules; each of the propulsion modules successively comprising:

a motorized link for rotation about an axis parallel to the axis V,     an offset arm, and     a platen supporting a propulsion unit able to deliver a thrust oriented along an axis perpendicular to the axis V, the two propulsion modules of each propulsion assembly being linked to the satellite on either side and substantially at equal distances from a plane P perpendicular to the axis V passing through a centre of mass CM of the satellite.

Advantageously, each of the two propulsion modules of each of the two propulsion assemblies, comprises a redundancy propulsion unit disposed on the platen in proximity to the said propulsion unit, and in such a way that its axis of thrust is parallel to that of the said propulsion unit.

Advantageously, the motorized link of each of the two propulsion modules of each of the two propulsion assemblies allows the rotation of the platen between:

a storage position, suitable for the launching of the satellite; the offset arm of the said propulsion module being maintained against the satellite, and     an operational position, suitable for the orbital control of the satellite, configured in such a way that the plane parallel to the axis V containing the axis of thrust of the propulsion unit of the said propulsion module, passes in proximity to the centre of mass CM of the satellite.

In an advantageous configuration of the invention, at least one of the two propulsion modules of at least one of the two propulsion assemblies, comprises a second motorized link for rotation about an axis T perpendicular both to the axis V and to the axis of thrust of the propulsion unit of the said propulsion module.

In this configuration, it is envisaged that the second motorized link links the first motorized link to the offset arm of the said propulsion module. It is also envisaged that the second motorized link links the offset arm and the platen of the said propulsion module. It is further envisaged that the second motorized link is linked to the platen by way of a second offset arm of the said propulsion module. Finally, it is likewise envisaged that the second motorized link links the first motorized link to the satellite.

The invention also pertains to a satellite with terrestrial orbit furnished with a propulsion system having the characteristics described above.

The invention also pertains to a method of inclination control for a satellite in geostationary orbit comprising a propulsion system having the characteristics described above, and comprising steps consisting in:

displacing each of the two propulsion modules of a first propulsion assembly, by means of their motorized link, in such a way that the plane parallel to the axis V containing the axis of thrust of their propulsion unit, passes in proximity to the centre of mass CM of the satellite,     simultaneously activating the propulsion units of each of the two propulsion modules of the said first propulsion assembly in proximity to a first orbital node,     displacing each of the two propulsion modules of the second propulsion assembly, by means of their motorized link, in such a way that the plane parallel to the axis V containing the axis of thrust of their propulsion unit, passes in proximity to the centre of mass CM of the satellite,     simultaneously activating the propulsion units of each of the two propulsion modules of the said second propulsion assembly in proximity to a second orbital node, opposite to the first orbital node.

The invention also pertains to a method of orbit transfer for a satellite comprising a propulsion system having the characteristics described above, and comprising steps consisting in:

for each of the two propulsion modules of each of the two propulsion assemblies, orienting the propulsion unit by means of the motorized link, in such a way that its axis of thrust is parallel to the plane of the orbit,     simultaneously activating the propulsion units of the two propulsion modules of the two propulsion assemblies.

The invention also pertains to a method of angular momentum control of a satellite comprising an angular momentum accumulation device and a propulsion system having the characteristics described above, characterized in that it comprises steps consisting in:

orienting the propulsion units of the two propulsion modules of at least one propulsion assembly by means of their motorized link in one and the same angular position.

simultaneously activating the two propulsion units thus oriented, so as to generate on the satellite a torque about the axis V.

The invention also pertains to a method of angular momentum control of a satellite comprising an angular momentum accumulation device and a propulsion system having the characteristics described above, characterized in that it comprises steps consisting in:

orienting the propulsion units of the two propulsion modules of at least one propulsion assembly by means of their motorized link in one and the same angular position,     activating the two propulsion units thus oriented in a differential manner, in terms of intensity or duration, so as to generate on the satellite a torque about an axis T perpendicular both to the axis V and to the two axes of thrust of the two propulsion units.

The invention also pertains to a method of angular momentum control of a satellite comprising an angular momentum accumulation device and a propulsion system having the characteristics described above, characterized in that it comprises steps consisting in:

orienting the propulsion units of the two propulsion modules of at least one propulsion assembly by means of their motorized link in a substantially distinct angular position,     activating the two propulsion units thus oriented so as to generate on the satellite a torque about an axis substantially parallel to the axes of thrust of the two propulsion units.

Finally, the invention pertains to a method of control of the motion in the plane of the orbit for a satellite in geostationary orbit comprising a propulsion system having the characteristics described above, characterized in that it comprises steps consisting in:

orienting the at least one of the two propulsion modules of at least one of the two propulsion assemblies which comprises a second motorized link,     activating the propulsion unit of the said propulsion module comprising the second motorized link, so as to generate on the satellite a force exhibiting a non-zero component along the axis V.

BRIEF DESCRIPTION OF THE DRAWINGS

The invention will be better understood and other advantages will become apparent on reading the detailed description of the embodiments given by way of example in the following figures.

FIG. 1, already presented, represents a geostationary satellite in orbit around the earth, FIG. 2, already presented, represents a contemporary architecture of a satellite comprising a structure on which are fixed diverse devices useful for the steering of the satellite and for its mission, FIGS. 3a, 3b and 3c, already presented, illustrate the principle of the orbital control for a satellite according to the known state of the art.

For the sake of clarity, the same elements will bear the same labels in the various figures.

DETAILED DESCRIPTION

Figure 4A:
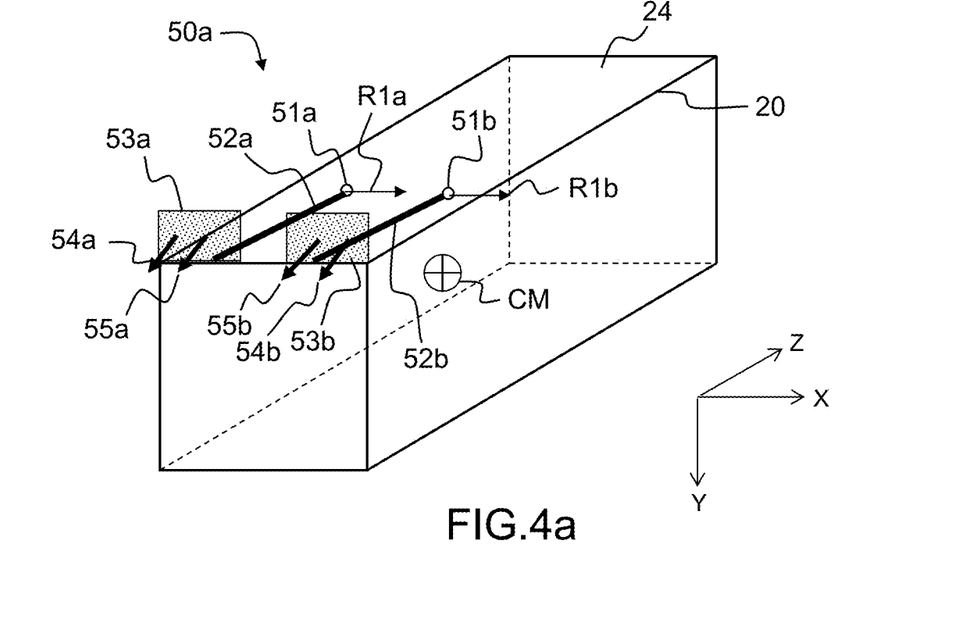
FIGS. 4a and 4b represent a first embodiment of the propulsion system respectively in the storage position and in the operational position.
Figure 4B:
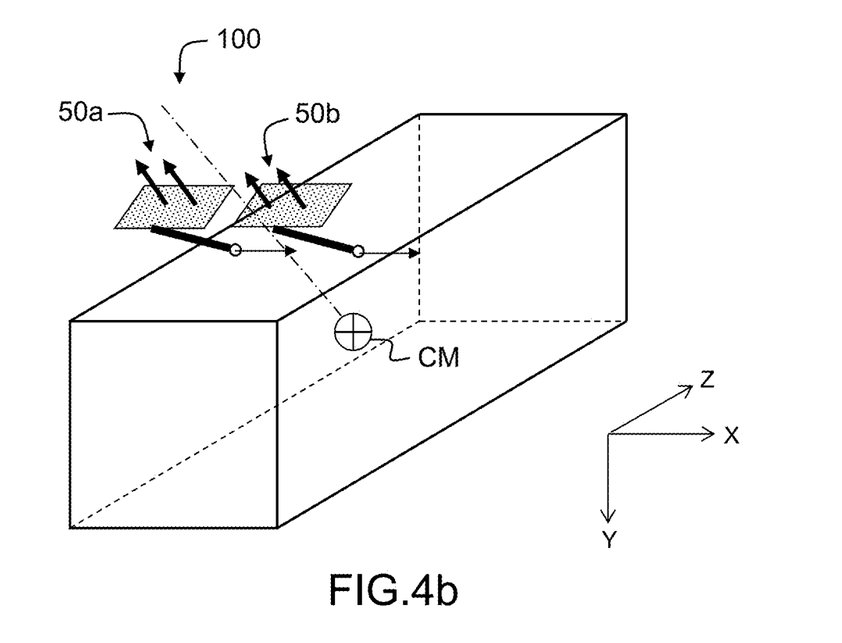

FIGS. 4a and 4b represent a first embodiment of the propulsion system respectively in the storage position and in the operational position. As described above, a satellite 10 in orbit 11 is stabilized in regard to three axes of a reference trihedron tied to the satellite by means of an attitude control system. The reference trihedron comprises an axis Z oriented towards the earth, an axis Y perpendicular to the orbit and oriented in the sense opposite to the angular momentum of the orbital rotation, and an axis X forming with the axes Y and Z a right-handed orthogonal frame. For a circular orbit, the X axis is then oriented in the direction of the speed of the satellite in orbit 11 around the earth 12. The satellite 10 comprises a parallelepipedal structure 20, two of whose faces 22 and 23, the so-called earth face and anti-earth face, are perpendicular to the Z axis and oriented respectively towards the earth and towards a direction opposite to the earth, and two opposite adjacent faces 24 and 25, termed the North face and the South face, are perpendicular to the Y axis and oriented respectively towards the North and the South in the terrestrial magnetic field. Also marked is a centre of mass CM of the satellite, whose position varies slightly in the course of the life of the satellite, and situated inside the structure 20.

For the sake of clarity, the description of the invention rests upon the frame formed by the axes X, Y and Z and upon a satellite whose structure 20 is parallelepipedal. The invention is not limited in any way to a satellite whose structure 20 is parallelepipedal, nor to a satellite stabilized on the three axes X, Y and Z. It extends in a general way to any satellite 10 with terrestrial orbit 11 having an angular momentum accumulation capacity, travelling with a speed of displacement tangential to the terrestrial orbit 11. Hereinafter, the speed axis is referenced axis V; it coincides with the X axis in the particular case represented in the figures of a satellite in circular orbit.

Figure 5A:
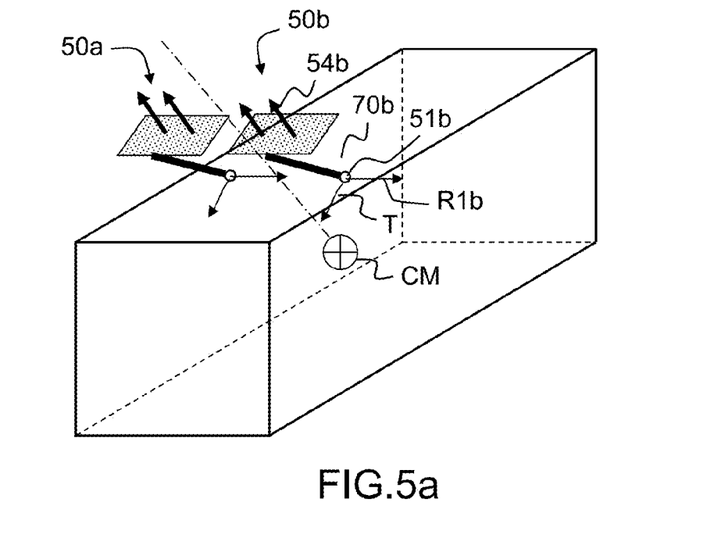
FIGS. 5a, 5b and 5c, represent a second embodiment of the propulsion system in the operational position.

In the first embodiment, the propulsion system comprises two propulsion assemblies fixed to the satellite, and facing one another with respect to the plane of the orbit 11. In the case of a conventional satellite with parallelepipedal structure, the two propulsion assemblies are disposed respectively on the North face 24 and South face 25. For better readability, FIGS. 4a, 4b and 5a represent a single propulsion assembly 100 fixed to the satellite on the North face 24. It is nonetheless understood that the propulsion system according to the invention comprises two propulsion assemblies facing one another with respect to the plane of the orbit 11.

Each of the propulsion assemblies comprises two propulsion modules, respectively 50a and 50b. Each of the propulsion modules, respectively 50a and 50b, successively comprises:
- a motorized link, respectively 51a and 51b, for rotation about an axis, respectively R1a and R1b, parallel to the axis V,
- an offset arm, respectively 52a and 52b, and
- a platen, respectively 53a and 53b, supporting a propulsion unit, respectively 54a and 54b, able to deliver a thrust oriented along an axis perpendicular to the axis V.

The propulsion modules 50a and 50b therefore exhibit an identical architecture, they are differentiated by their setup on the satellite. The two propulsion modules of each propulsion assembly are linked to the satellite, on the North face 24, on either side and substantially at equal distances from a plane P perpendicular to the axis V passing through the centre of mass CM of the satellite.

Advantageously, each propulsion module, respectively 50a and 50b, also comprises a redundancy propulsion unit, respectively 55a and 55b, disposed on the platen, respectively 53a and 53b, in proximity to the principal propulsion unit, respectively 54a and 54b. This redundancy propulsion unit, respectively 55a and 55b, is oriented on the platen in such a way that its axis of thrust is parallel to the axis of thrust of the said principal propulsion unit, respectively 54a and 54b.

Advantageously, the principal propulsion unit and the redundancy propulsion unit of each of the propulsion modules are positioned in-line along the speed axis as represented in FIGS. 4a and 4b. It is also envisaged to dispose the two redundancy propulsion units between the two principal propulsion units, and at equal distance from the previously defined plane P.

As we have mentioned, the propulsion system according to the invention comprises two propulsion assemblies whose identical architecture comprises the hardware components described hereinabove. Thus, each of the two propulsion modules of the propulsion assembly 100 is disposed facing, with respect to the plane of the orbit, an identical propulsion module of the second propulsion assembly (not represented).

FIG. 4a represents the propulsion assembly 100 in a storage position suitable for the launching of the satellite. In this position, each of the two propulsion modules, respectively 50a and 50b, is in the storage position; the offset arm, respectively 53a and 53b is maintained against the satellite, against the North face of the structure of the satellite in the figure. Thus configured, the propulsion system exhibits limited bulkiness. It is advantageous to orient the axes of thrust of the propulsion units of each of the propulsion modules in such a way that, in the storage position, they are parallel to the Z axis. Thus configured, the storage position is suitable for the orbit transfer, the simultaneous firing of the propulsion units of the two propulsion assemblies generating a resultant thrust aligned with the Z axis. It is therefore envisaged to invoke the propulsion system, by simultaneous firing of the principal and/or redundancy propulsion units of the propulsion system, so as to achieve the orbit transfer, either as a supplement to the propulsion unit PSP or in place of this propulsion unit PSP.

In an alternative configuration, not represented, the propulsion units are oriented on their platen in such a way that, in the storage position, their axes of thrust are not strictly parallel to the Z axis but are slightly inclined towards the plane of the orbit. In this configuration, it is envisaged, prior to orbit transfer, to displace the propulsion units by means of the motorized link, to an intermediate position so as to bring their axis of thrust parallel to the Z axis.

FIG. 4b represents the propulsion assembly 100 in an operational position suitable for orbital control. In this position, for each of the two propulsion modules 50a and 50b, the offset arm and the platen are displaced by means of the motorized link in such a way that the plane parallel to the axis V containing the axis of thrust of the propulsion unit of the said propulsion module, passes in proximity to the centre of mass CM of the satellite.

Thus, the simultaneous firing of the propulsion units 54a and 54b of the two propulsion modules 50a and 50b, results in a thrust on the centre of mass CM, having a considerable component along the Y axis. Herein is understood a benefit of the present invention in respect of inclination control in the case where the centre of mass CM of the satellite is distanced from the anti-earth face 23. Indeed, the known systems which have propulsion units in proximity to the anti-earth face generate a thrust exhibiting only a weak component along the Y axis. This results in weak effectiveness of the inclination control. The propulsion assembly according to the invention makes it possible, through the displacement of the propulsion units offset on the platen, and by means of the motorized link fixed some distance from the anti-earth face, to generate a thrust having a considerably more significant component along the Y axis. This results in better effectiveness of the inclination control, the quantity of fuel consumed needlessly by the component along the X axis being reduced. Typically, it is envisaged to position the motorized link 51a in proximity to the middle of the North face along the Z axis.

During design, it is however required to take account of constraints imposed by the other constituents of the satellite. By way of example, a propulsion module which is too voluminous, or positioned too near the solar generators is liable to reduce the effectiveness of the solar generators through shadowing, during orbit transfer or during station keeping. Furthermore, the firing of the propulsion units may cause erosion or contamination of the equipment (reflectors of antennas, solar generators) if they are disposed too near this equipment.

Advantageously, the propulsion system also allows the control of the torque about three axes. Typically, the simultaneous firing of the two propulsion units oriented slightly off the centre of mass CM, generate in addition to the satellite speed increment a roll torque about the X axis. In this position where the two propulsion modules exhibit one and the same orientation about their rotation axis, a differential firing, in terms of intensity or duration, of the two propulsion units 54a and 54b, generate in addition to the satellite speed increment a torque about an axis T perpendicular both to the axis V and to the axes of thrust of the propulsion units. Finally, the propulsion assembly 100 according to the invention advantageously makes it possible to decouple the orientation of each of the two propulsion modules 50a and 50 about their rotation axis. Thus, starting from the operational position described above, a limited amplitude reorientation of each of the propulsion modules 50a and 50b by rotation in the opposite sense about their rotation axis, makes it possible to generate a torque about a third axis, perpendicular both to the axis T and to the axis V.

A benefit of the present invention is therefore understood, which makes it possible by means of a simple and inexpensive system to ensure both North South inclination control and the control of the torque in relation to three axes.

Figure 5B:
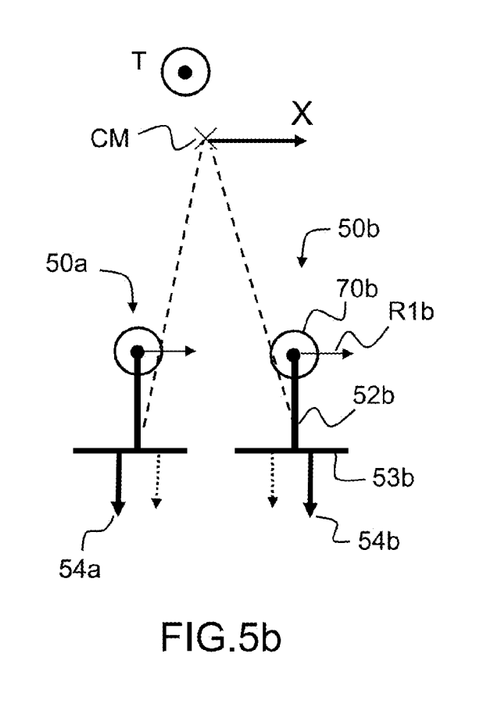
Figure 5C:
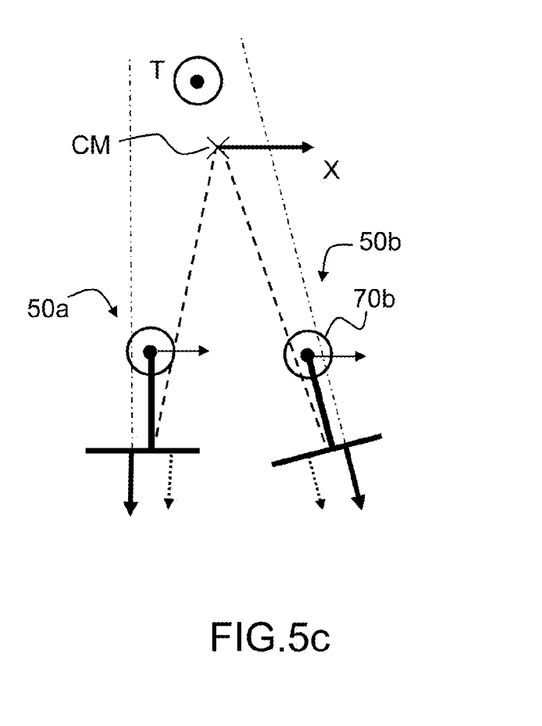

FIGS. 5a, 5b and 5c, represent a second embodiment of the propulsion system in the operational position. As previously, the figures represent only a single propulsion assembly but the propulsion system according to this second embodiment comprises two propulsion assemblies facing one another with respect to the plane of the orbit.

In this second embodiment, the propulsion assembly comprises two propulsion modules 50a and 50b exhibiting the same characteristics as described above. These characteristics are not repeated in detail here. This embodiment is differentiated from the first embodiment by the addition of a rotational degree of freedom to at least one propulsion module of a propulsion assembly. Of course, the addition of a rotational degree of freedom to one or more other propulsion modules, of the same propulsion assembly or of the opposite propulsion assembly, is also envisaged, notably so as to improve the robustness of the propulsion system to possible faults.

In FIGS. 5a, 5b and 5c, a further degree of freedom is added to the propulsion module 50b. Thus this propulsion module 50b comprises a second motorized link 70b for rotation about an axis T perpendicular both to the axis V and to the axis of thrust of the propulsion unit 54b of the propulsion module 50b. In the figures, this second motorized link is linked directly to the first motorized link, or stated otherwise the motorized link 51a may be regarded as a two-axis link, of gimbal link type for example. This embodiment is however not limiting of the present invention and it is also envisaged to dispose this second link between the offset arm 52b and the platen 53b; or to dispose the second link 70b between the offset arm 52b and a second offset arm, itself linked to the platen 53b; or else to dispose the second motorized link 70b between the first motorized link 51b and the satellite 10.

The benefit of this second embodiment is illustrated by FIGS. 5b and 5c. FIG. 5b represents the two propulsion modules 50a and 50b in the operational position. The plane containing the axes of thrust of the propulsion units 54a and 54b of the two propulsion modules 50a and 50b passes through the centre of mass CM of the satellite. The second motorized link 70b of the propulsion module 50b is in a centred position; the axis of thrust being aligned with the Z axis (as is the case represented in FIG. 5a). In this view, the propulsion module is represented in the plane containing the axes of thrust of the propulsion units. This plane is perpendicular to the rotation axis T of the second motorized link 70b, it contains the rotation axes R1a and R1b, of the first motorized links 51a and 51b of the propulsion modules 50a and 50b. In this centred position of the second motorized link 70b, the behaviour of the propulsion assembly is identical to that described in respect of the first embodiment of the invention. Typically, the simultaneous firing of the two propulsion units aligned with the centre of mass allows a speed increment exhibiting a significant component along the Y axis. The simultaneous firing of the propulsion units in a manner which is slightly shifted with respect to the centre of mass makes it possible to generate an X-wise torque in addition to the speed increment. The differential firing of the propulsion units makes it possible to generate a second torque about the axis T. The firing of the propulsion units previously shifted one with respect to the other by means of the first motorized link (51a, 51b) makes it possible to generate a torque about a third axis.

FIG. 5c represents the two propulsion modules 50a and 50b according to the same view in the plane containing the axes of thrust of the propulsion units, but here the platen 53b and the propulsion unit 54b of the propulsion module 50b have been displaced by rotation about the axis T, by means of the second motorized link 70a. In this position, the simultaneous firing of the propulsion units 54a and 55a makes it possible to generate a force exhibiting a component along the speed axis V, in addition to its other components. Likewise, by tailoring a differential firing of the two propulsion units 54a and 55a, in intensity or in duration, it is possible to preserve this force component along the speed axis while controlling the torque generated about the axis T. Herein is understood the benefit of this configuration. The addition of the second motorized link 70b on one of the propulsion modules, offering a new rotational degree of freedom about T, allows orbital control in relation to the speed axis, stated otherwise East-West station keeping.

The invention also pertains to a satellite with terrestrial orbit furnished with a propulsion system having the characteristics described above.

The invention also pertains to a method of inclination control for a satellite in geostationary orbit comprising a propulsion system having the characteristics described above, and comprising steps consisting in:
- displacing each of the two propulsion modules of a first propulsion assembly, by means of their motorized link, in such a way that the plane parallel to the axis V containing the axis of thrust of their propulsion unit, passes in proximity to the centre of mass CM of the satellite,
- simultaneously activating the propulsion units of each of the two propulsion modules of the said first propulsion assembly in proximity to a first orbital node,
- displacing each of the two propulsion modules of the second propulsion assembly, by means of their motorized link, in such a way that the plane parallel to the axis V containing the axis of thrust of their propulsion unit, passes in proximity to the centre of mass CM of the satellite,
- simultaneously activating the propulsion units of each of the two propulsion modules of the said second propulsion assembly in proximity to a second orbital node, opposite to the first orbital node.

The invention also pertains to a method of orbit transfer for a satellite comprising a propulsion system having the characteristics described above, and comprising steps consisting in:
- for each of the two propulsion modules of each of the two propulsion assemblies, orienting the propulsion unit by means of the motorized link, in such a way that its axis of thrust is parallel to the plane of the orbit,
- simultaneously activating the propulsion units of the two propulsion modules of the two propulsion assemblies.

The invention also pertains to a method of angular momentum control of a satellite comprising an angular momentum accumulation device and a propulsion system having the characteristics described above, characterized in that it comprises steps consisting in:
- orienting the propulsion units of the two propulsion modules of at least one propulsion assembly by means of their motorized link in one and the same angular position.
- simultaneously activating the two propulsion units thus oriented, so as to generate on the satellite a torque about the axis V.

The invention also pertains to a method of angular momentum control of a satellite comprising an angular momentum accumulation device and a propulsion system having the characteristics described above, characterized in that it comprises steps consisting in:
- orienting the propulsion units of the two propulsion modules of at least one propulsion assembly by means of their motorized link in one and the same angular position,
- activating the two propulsion units thus oriented in a differential manner, in terms of intensity or duration, so as to generate on the satellite a torque about an axis T perpendicular both to the axis V and to the two axes of thrust of the two propulsion units.

The invention also pertains to a method of control of the motion in the plane of the orbit for a satellite in geostationary orbit comprising a propulsion system having the characteristics described above, characterized in that it comprises steps consisting in:
- orienting at least one of the two propulsion modules of at least one of the two propulsion assemblies which comprises a second motorized link,
- activating the propulsion unit of the said propulsion module comprising the second motorized link, so as to generate on the satellite a force exhibiting a non-zero component along the axis V.

Finally, the invention pertains to a method of angular momentum control of a satellite comprising an angular momentum accumulation device and a propulsion system having the characteristics described above, characterized in that it comprises steps consisting in:
- orienting the propulsion units of the two propulsion modules of at least one propulsion assembly by means of their motorized link in a substantially distinct angular position,
- activating the two propulsion units thus oriented so as to generate on the satellite a torque about an axis substantially parallel to the axes of thrust of the two propulsion units.

The invention claimed is:

1. A propulsion system for the orbital control of a satellite with terrestrial orbit travelling with a speed of displacement along an axis V tangential to the orbit, comprising two propulsion assemblies, fixed to the satellite, and facing one another with respect to the plane of the orbit, each of the propulsion assemblies comprising two propulsion modules; each of the propulsion modules successively including:
   - a first motorized link for rotation about an axis parallel to the axis V,
   - an offset arm, and
   - a platen supporting a propulsion unit able to deliver a thrust oriented along an axis perpendicular to the axis V,
   - the two propulsion modules of each propulsion assembly being linked to the satellite on either side and substantially at equal distances from a plane P perpendicular to the axis V passing through a centre of mass CM of the satellite,
   - wherein at least one first motorized link provides an only motorized link of a respective propulsion module.

2. The propulsion system according to claim 1, in which each of the two propulsion modules of each of the two propulsion assemblies, comprises a redundancy propulsion unit disposed on the platen in proximity to the said propulsion unit, and in such a way that its axis of thrust is parallel to that of the said propulsion unit.

3. The propulsion system according to claim 1, in which the first motorized link of each of the two propulsion modules of each of the two propulsion assemblies allows the rotation of the platen between:
   - a storage position, suitable for the launching of the satellite; the offset arm of the said propulsion module being maintained against the satellite, and
   - an operational position, suitable for the orbital control of the satellite, configured in such a way that the plane parallel to the axis V containing the axis of thrust of the propulsion unit of the said propulsion module, passes in proximity to the centre of mass CM of the satellite.

4. The propulsion system according to claim 1, in which at least one of the two propulsion modules of at least one of the two propulsion assemblies, comprises a second motorized link for rotation about an axis T perpendicular both to the axis V and to the axis of thrust of the propulsion unit of the said propulsion module.

5. The propulsion system according to claim 4, in which the second motorized link links the first motorized link with the offset arm of the said propulsion module.

6. The propulsion system according to claim 4, in which the second motorized link links the offset arm and the platen of the said propulsion module.

7. The propulsion system according to claim 6, in which the second motorized link is linked to the platen by way of a second offset arm of the said propulsion module.

8. The propulsion system according to claim 4, in which each second motorized link links a respective first motorized link with the satellite.

9. A satellite with terrestrial orbit furnished with a propulsion system according to claim 1.

10. A method of inclination control for a satellite in geostationary orbit comprising a propulsion system according to claim 1, comprising:
   displacing each of the two propulsion modules of a first propulsion assembly, by means of respective first motorized links, in such a way that the plane parallel to the axis V containing the axis of thrust of their propulsion unit, passes in proximity to the centre of mass CM of the satellite,
   simultaneously activating the propulsion units of each of the two propulsion modules of the said first propulsion assembly in proximity to a first orbital node,
   displacing each of the two propulsion modules of the second propulsion assembly, by means of respective first motorized links, in such a way that the plane parallel to the axis V containing the axis of thrust of their propulsion unit, passes in proximity to the centre of mass CM of the satellite,
   simultaneously activating the propulsion units of each of the two propulsion modules of the said second propulsion assembly in proximity to a second orbital node, opposite to the first orbital node.

11. A method of orbit transfer for a satellite comprising a propulsion system according to claim 1, comprising:
   for each of the two propulsion modules of each of the two propulsion assemblies, orienting the propulsion unit by means of a respective first motorized link, in such a way that its axis of thrust is parallel to the plane of the orbit,
   simultaneously activating the propulsion units of the two propulsion modules of the two propulsion assemblies.

12. A method of angular momentum control of a satellite comprising an angular momentum accumulation device and a propulsion system according to claim 1, comprising:
   orienting the propulsion units of the two propulsion modules of at least one propulsion assembly by means of respective first motorized links in one and the same angular position,
   simultaneously activating the propulsion units of the two propulsion modules, so as to generate on the satellite a torque about the axis V.

13. A method of angular momentum control of a satellite comprising an angular momentum accumulation device and a propulsion system according to claim 1, comprising:
   orienting the propulsion units of the two propulsion modules of at least one propulsion assembly by means of respective first motorized links in one and the same angular position,
   activating the propulsion units of the two propulsion modules in a differential manner, in terms of intensity or duration, so as to generate on the satellite a torque about an axis T perpendicular both to the axis V and to the two axes of thrust of the two propulsion units.

14. A method of control of the motion in the plane of the orbit for a satellite in geostationary orbit comprising a propulsion system according to claim 1, comprising:
   orienting at least one of the two propulsion modules of at least one of the two propulsion assemblies which includes a second motorized link,
   activating the propulsion unit of the at least one of the two propulsion modules including the second motorized link, so as to generate on the satellite a force exhibiting a non-zero component along the axis V.

15. A method of angular momentum control of a satellite comprising an angular momentum accumulation device and a propulsion system according to claim 1, comprising:
   orienting each of the propulsion units of the two propulsion modules of at least one propulsion assembly in a respective substantially distinct angular position by means of a respective first motorized link,
   activating the propulsion units of the two propulsion modules so as to generate on the satellite a torque about an axis substantially parallel to each of the axes of thrust of the propulsion units of the two propulsion modules.

16. The propulsion system according to claim 1, wherein only a single propulsion module of the propulsion system includes a second motorized link for rotation about an axis T perpendicular to both the axis V and to a respective axis of thrust of the single propulsion unit.

17. The propulsion system according to claim 1, wherein one propulsion module of each of the two propulsion assemblies includes a second motorized link for rotation bout an axis T perpendicular to the axis V and each respective axis of thrust of each one propulsion module.

18. The propulsion system according to claim 1, wherein each of the propulsion modules has only a single motorized link that is provided by a respective first motorized link for rotation about a respective axis parallel to the axis V.

* * * * *